(12) United States Patent
Zega et al.

(10) Patent No.: US 11,933,810 B2
(45) Date of Patent: Mar. 19, 2024

(54) Z-AXIS RESONANT ACCELEROMETER WITH IMPROVED-PERFORMANCE DETECTION STRUCTURE

(71) Applicant: STMICROELECTRONICS S.R.L., Agrate Brianza (IT)

(72) Inventors: Valentina Zega, Milan (IT); Gabriele Gattere, Castronno (IT); Attilio Alberto Frangi, Milan (IT); Andrea Opreni, Terno d'Isola (IT); Manuel Riani, Como (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 17/930,689

(22) Filed: Sep. 8, 2022

(65) Prior Publication Data

US 2023/0082421 A1 Mar. 16, 2023

(30) Foreign Application Priority Data

Sep. 15, 2021 (IT) .......................... 102021000023795

(51) Int. Cl.
*G01P 15/097* (2006.01)
*G01P 15/08* (2006.01)
(Continued)

(52) U.S. Cl.
CPC ........ *G01P 15/097* (2013.01); *G01P 15/0802* (2013.01); *G01P 15/125* (2013.01); *G01P 15/18* (2013.01)

(58) Field of Classification Search
CPC ...... G01P 15/097; G01P 15/125; G01P 15/08; G01P 15/0802; G01P 15/18
See application file for complete search history.

(56) References Cited

U.S. PATENT DOCUMENTS 6,119,520 A 9/2000 Woodruff
8,468,887 B2 6/2013 McNeil et al.
(Continued)

OTHER PUBLICATIONS

Comi et al., "Sensitivity and temperature behavior of a novel z-axis differential resonant micro accelerometer," *Journal of Micromechanics and Microengineering* 26:035006, 2016. (11 pages).
(Continued)

*Primary Examiner* — Helen C Kwok
(74) *Attorney, Agent, or Firm* — Seed IP Law Group LLP

(57) ABSTRACT

The present disclosure is directed to a detection structure for a vertical-axis resonant accelerometer. The detection structure includes an inertial mass suspended above a substrate and having a window provided therewithin and traversing it throughout a thickness thereof. The inertial mass is coupled to a main anchorage, arranged in the window and integral with the substrate, through a first and a second anchoring elastic element of a torsional type. The detection structure also includes at least a first resonant element having longitudinal extension, coupled between the first elastic element and a first constraint element arranged in the window. The first constraint element is suspended above the substrate, to which it is fixedly coupled through a first auxiliary anchoring element which extends below the first resonant element with longitudinal extension and is integrally coupled between the first constraint element and the main anchorage.

20 Claims, 5 Drawing Sheets

(51) Int. Cl.
*G01P 15/125* (2006.01)
*G01P 15/18* (2013.01)

(56) References Cited

U.S. PATENT DOCUMENTS

| | | |
|---|---|---|
| 8,671,756 B2 | 3/2014 | Comi et al. |
| 9,377,482 B2 | 6/2016 | Comi et al. |
| 2010/0186510 A1* | 7/2010 | Robert ............... G01P 15/0802 73/514.29 |
| 2012/0132003 A1* | 5/2012 | Comi .................... G01P 15/097 73/514.29 |
| 2012/0262026 A1 | 10/2012 | Lin et al. |
| 2013/0104677 A1* | 5/2013 | Watanabe ............ G01P 15/097 73/865.8 |
| 2017/0052207 A1* | 2/2017 | Classen ................ G01P 15/125 |
| 2018/0120342 A1* | 5/2018 | Tocchio ............... G01P 15/097 |
| 2019/0277634 A1 | 9/2019 | Motiee |
| 2020/0025790 A1 | 1/2020 | Reinke |

OTHER PUBLICATIONS

Kim et al., "Wafer Level Vacuum Packaged Out-of-Plane and In-Plane Differential Resonant Silicon Accelerometers for Navigational Applications," *Journal of Semiconductor Technology and Science* 5(1):58-66, Mar. 2005.

Marra et al., "Solving FSR Versus Offset-Drift Trade-Offs With Three-Axis Time-Switched FM MEMS Accelerometer," *Journal of Microelectromechanical Systems* 27(5):790-799, Oct. 2018.

Wang et al., "Micro-machined resonant out-of-plane accelerometer with a differential structure fabricated by silicon-on-insulator-MEMS technology," *Micro & Nano Letters* 7(12):1230-1233, 2012.

Yang et al., "A New Z-axis Resonant Micro-Accelerometer Based on Electrostatic Stiffness," *Sensors* 15:687-702, 2015.

Zhao et al., "A novel micro-machined out-of-plane resonant accelerometer with differential structure of different-height resonant beams," *Key Engineering Materials* 645-646:488-491, 2015.

\* cited by examiner

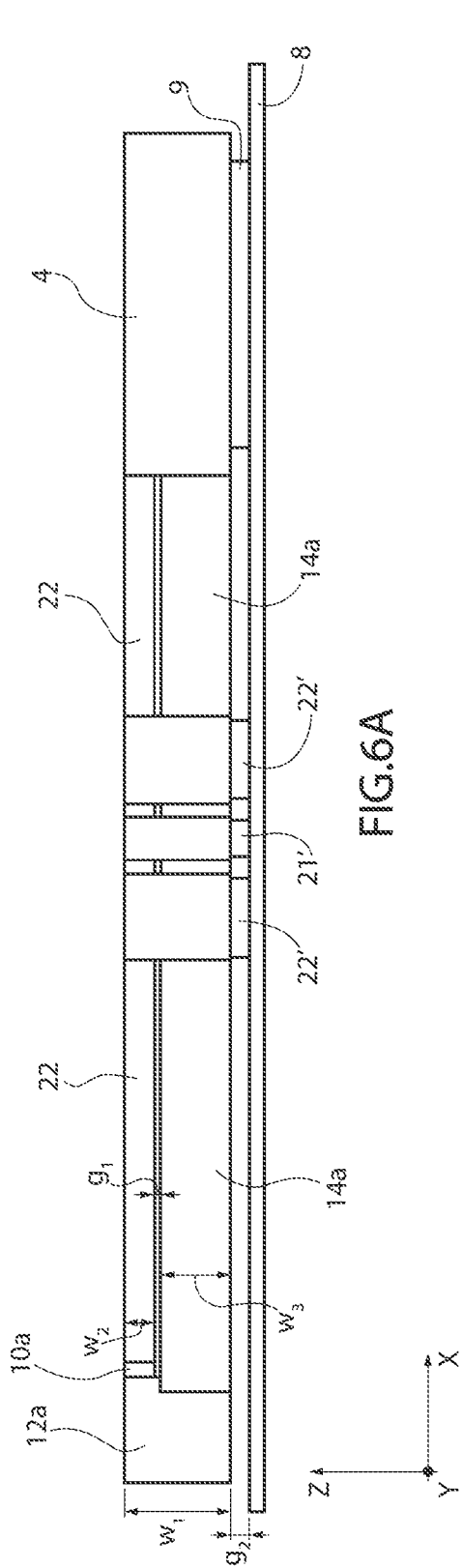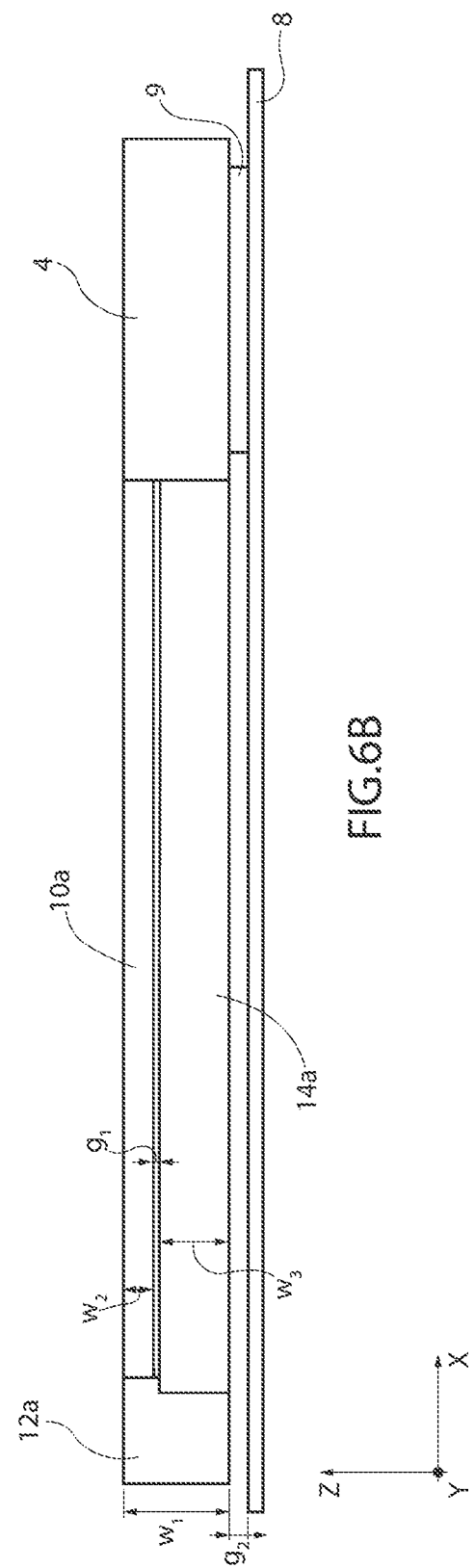

Z-AXIS RESONANT ACCELEROMETER WITH IMPROVED-PERFORMANCE DETECTION STRUCTURE

BACKGROUND

Technical Field

The present disclosure relates to a vertical-axis (so-called "z-axis") resonant accelerometer with a detection structure having improved-performance.

Description of the Related Art

MEMS—Micro Electro Mechanical System—accelerometers, which operate with a frequency modulation (FM) detection principle and are able to detect a vertical acceleration component, acting in a direction transverse to, or out of, a plane of main extension of a corresponding detection structure are known (including in this definition also devices with sub-micrometric dimensions).

In these resonant accelerometers, an external acceleration to be measured produces a detectable variation of the resonance frequency of one or more resonant elements of the detection structure, maintained in oscillation by a driving circuit; the resonant element may be formed by an entire inertial mass (proof mass or free mass) of the detection structure, or by a distinct element coupled to the same inertial mass.

Resonant detection, with respect to other measuring principles, has the advantage of offering a direct frequency output, of a quasi-digital type, high sensitivity, high disturbance rejection and wide-dynamic range. Furthermore, resonant accelerometers have good properties of integrability, since they are packaged in vacuum and work at low pressures.

Depending on the configuration of the detection structure, the variation of the resonance frequency may be induced by the presence of axial stresses in a resonant element and by a corresponding variation of the mechanical stiffness, or by the variation of the so-called electrostatic stiffness to which the same resonant element is subject.

As shown schematically in FIG. 1A, in the case of accelerometers whose operation is based on the detection of a variation of the resonance frequency due to a variation of electrical stiffness, an external acceleration $a_{ext}$ acting in the vertical direction (along a z-axis) generates, on an inertial mass m of the detection structure (elastically coupled to a support), an inertial force that induces a displacement of the inertial mass and varies a distance, or "gap," between the same inertial mass and a resonant element r coupled thereto. The gap variation produces a variation of "electrical stiffness," which causes a corresponding variation of the resonance frequency of the resonant element, maintained in oscillation through an actuation structure a (in general, the gap variation, with the consequent variation of "electrical stiffness," may also occur between the resonant element and electrodes coupled thereto).

As shown schematically in FIG. 1B, in the case of accelerometers whose operation is based on the detection of a variation of the resonant frequency due to a variation of mechanical stiffness, the aforementioned external acceleration $a_{ext}$ generates, on the inertial mass m of the detection structure, an inertial force which induces a displacement of the same inertial mass, which determines an axial stress (of traction or compression) on the resonant element r mechanically coupled thereto, this axial stress being proportional to the aforementioned external acceleration.

Among the known solutions of resonant accelerometers based on a variation of electrostatic stiffness it is possible to mention, for example:

B. Yang, X. Wang, B. Dai, X. Liu, "A new z axis resonant micro accelerometer based on electrostatic stiffness," Sensors, vol. 15, pp. 687 702, 2015;

C. Comi et al, "Sensitivity and temperature behavior of a novel z axis differential accelerometer," J. Micromech Microeng, vol. 26, 2016;

I. Kim et al, "Wafer Level vacuum packaged out of plane and in plane differential resonant silicon accelerometers for navigational applications" J. Semiconductor Tech. Sc., Vol. 5, no. 1, pp 58-66, 2005; and C. R. Marra, A. Tocchio, F. Rizzini, G. Langfelder, "Solving FSR versus offset drift tradeoffs with three axis time switched FM MEMS accelerometer" J. Microelectromech. Syst., Vol. 27, n. 5, 2018.

Among the known solutions of resonant accelerometers based on a variation of mechanical stiffness it is possible to mention, for example:

J. Wang, Y. Shang, J. Chen, Z. Sun, D. Chen, "Micro machined resonant out of plane accelerometer with a differential structure fabricated by silicon on insulator mems technology," Micro & Nano Letters, vol. 7 (12), pp. 1230-1233, 2012; and S. M. Zhao, Y. F. Liu, J. X. Dong, "A novel micro machined out of plane resonant accelerometer with differential structure of different height resonant beams," Key Engineering Materials vol. 645, pp 488-491, 2015.

Further resonant accelerometers of known type are described, e.g., in: U.S. Pat. No. 8,468,887 B2; US 2019/0277634 A1; U.S. Pat. No. 9,377,482 B2; and U.S. Pat. No. 8,671,756 B2.

The present Applicant has found that the current solutions of Z-axis resonant accelerometers have in any case some drawbacks, including: reduced sensitivity; large footprint; limited ability of rejecting disturbances; limited dynamics; and reduced linearity.

None of the aforementioned resonant accelerometers is therefore completely satisfactory as regards the electrical characteristics and mechanical dimensions, mainly in the case of portable applications where particularly reduced consumption and dimensions are desired.

BRIEF SUMMARY

The present disclosure is directed to a detection structure for a z-axis resonant accelerometer, having improved mechanical and electrical characteristics, in particular as regards the sensitivity in external acceleration detection and the resulting dimensions.

The detection structure includes an inertial mass suspended above a substrate and having a window provided therewithin and traversing it throughout a thickness thereof. The inertial mass is coupled to a main anchorage, arranged in the window and integral with the substrate, through a first and a second anchoring elastic element of a torsional type. The first and second anchoring elastic elements define a rotation axis of the inertial mass, such that they allow the inertial mass an inertial movement of rotation in response to an external acceleration acting along z-axis. The detection structure also includes at least a first resonant element having longitudinal extension, coupled between the first elastic element and a first constraint element arranged in the window. The first constraint element is suspended above the substrate, to which it is fixedly coupled through a first auxiliary anchoring element which extends below the first resonant element with longitudinal extension and is integrally coupled between the first constraint element and the main anchorage.

BRIEF DESCRIPTION OF THE SEVERAL VIEWS OF THE DRAWINGS

For a better understanding of the present disclosure, embodiments thereof are now described, purely by way of non-limiting example, with reference to the attached drawings, wherein:

FIGS. 6A and 6B are sectional views of the portion of the detection structure of FIG. 3;

DETAILED DESCRIPTION

Figure 1A:
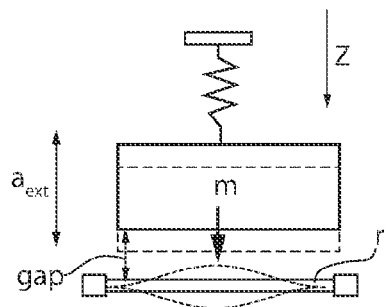
FIGS. 1A and 1B are schematic representations of resonant accelerometers based on a variation of electrostatic stiffness and, respectively, on a variation of mechanical stiffness.
Figure 1B:
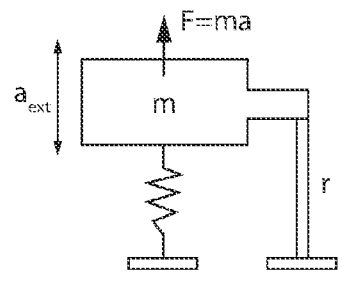
Figure 2:
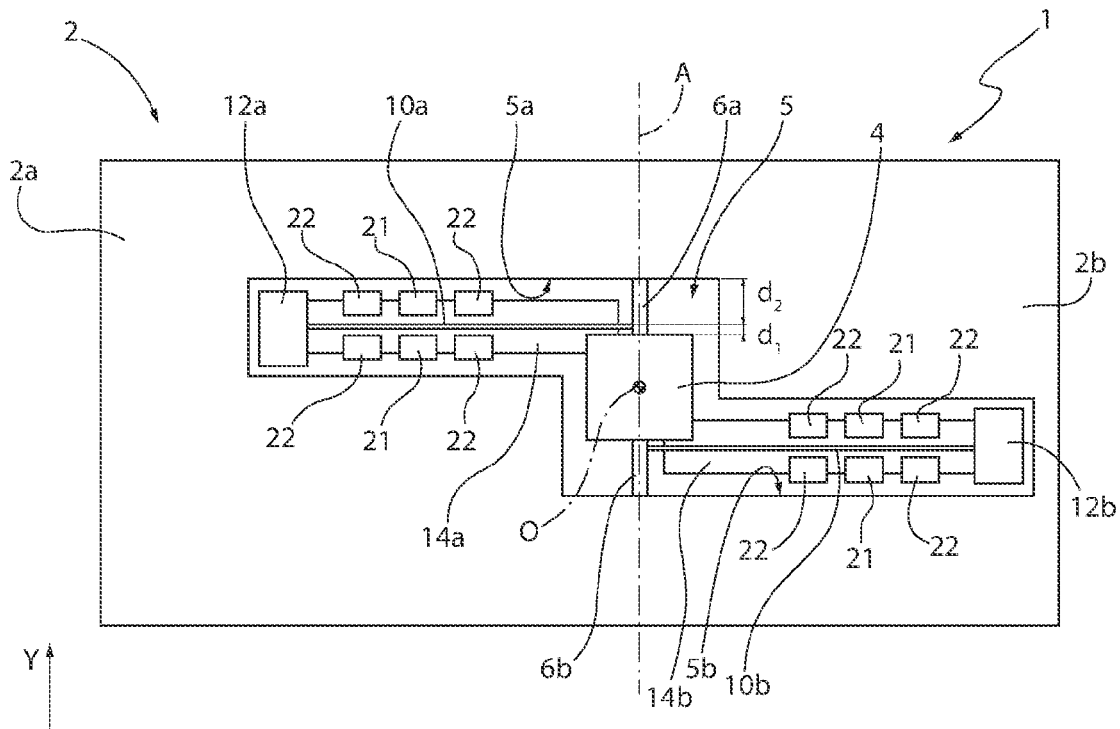
FIG. 2 is a schematic plan view of a detection structure of a vertical-axis resonant accelerometer, according to the present disclosure.
Figure 3:
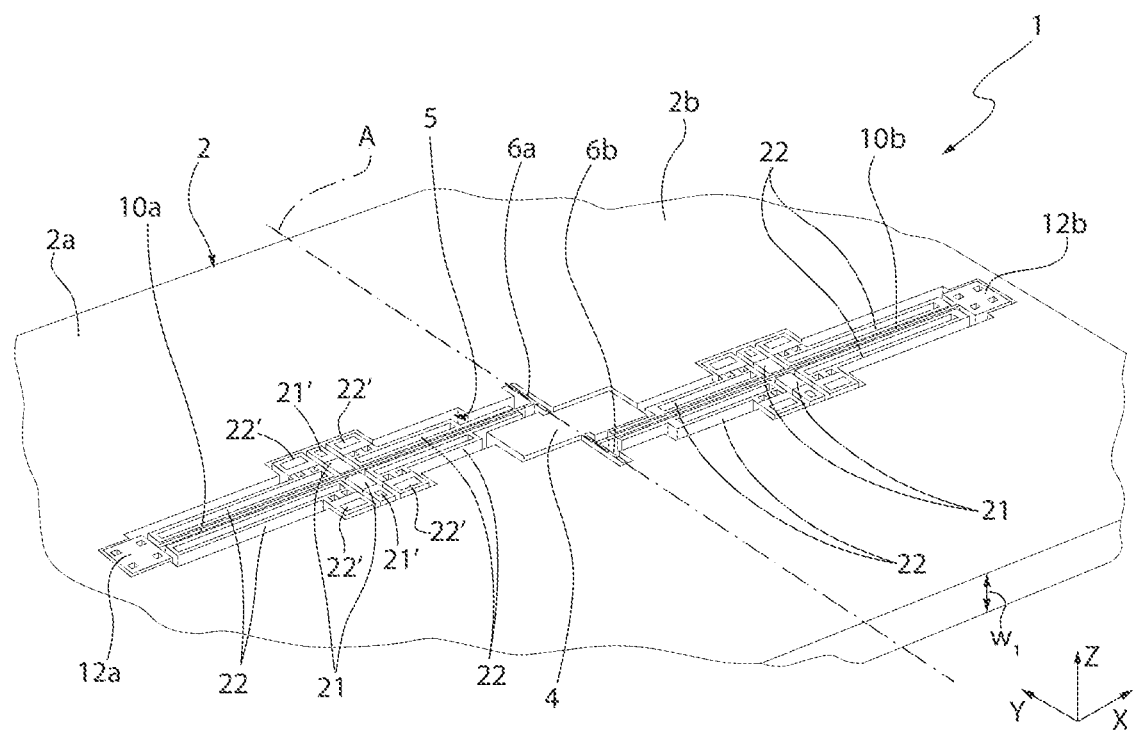
FIG. 3 is a perspective plan view of an embodiment of the detection structure of FIG. 2.

FIGS. 2 and 3 show, respectively in a schematic and more detailed manner, an embodiment of a detection structure, indicated as a whole with 1, of a vertical-axis (z-axis) resonant accelerometer. The detection structure 1 is manufactured in an integrated manner, with semiconductor surface micromachining techniques, in particular starting from a body of semiconductor material (such as silicon).

FIGS. 4, 5A-5B and 6A-6B show, in a detailed manner, portions of the detection structure 1, to facilitate the understanding of what will be described hereinafter.

The detection structure 1 comprises an inertial mass 2, having a main extension, in the example with a generically rectangular shape, in a horizontal plane xy, defined by a first and a second horizontal axis x, y; the inertial mass 2 has a first thickness $w_1$ (shown in FIG. 3) in a direction orthogonal to the same xy-plane, along a vertical axis (z-axis) defining a set of three orthogonal axes with the aforementioned first and second horizontal axes x, y. The z-axis also defines the detection direction of an external acceleration by the detection structure 1.

The inertial mass 2 is anchored to an underlying substrate 8 (illustrated in FIG. 6A and in FIG. 6B), e.g., a substrate of semiconductor material, such as silicon, so as to be suspended above the same substrate 8, with the xy-plane substantially parallel to a top surface of the same substrate 8, at rest (i.e., in the absence of external acceleration).

The inertial mass 2 is elastically coupled to a single main anchorage 4 arranged internally within the footprint of the same inertial mass 2 in the xy-plane; the main anchorage 4 is for example formed by a pillar which extends vertically towards the substrate 8 and is mechanically and integrally coupled to the same substrate 8 through a coupling region 9 (see again the aforementioned FIGS. 6A and 6B).

The main anchorage 4 is arranged in a window 5, provided inside the inertial mass 2 and traversing it throughout its thickness; the same main anchorage 4 has, for example, a substantially square or rectangular shape in the horizontal plane xy.

The inertial mass 2 is connected to the aforementioned main anchorage 4 through a first and a second elastic elements 6a, 6b, with longitudinal extension and aligned in the example along the second horizontal axis y, on opposite sides of the same main anchorage 4.

The aforementioned first and second elastic elements 6a, 6b also have the first thickness $w_1$ along the vertical axis z (as shown in FIGS. 5A-5B and 6A-6B).

In particular, the first and second elastic elements 6a, 6b are of a torsional type (i.e., have high bending stiffness and are yielding to torsion) and are configured to maintain the inertial mass 2 suspended above the substrate 8 and to allow a rotation movement thereof out of the xy-plane, around a rotation axis A, parallel to the second horizontal axis y and defined by the extension axis of the same first and second elastic elements 6a, 6b; this movement is, as on the other hand also discussed hereinafter, the first proper mode of the inertial mass 2.

In particular, the inertial mass 2 has an asymmetrical mass distribution with respect to the first rotation axis A, in such a way that it is constrained in an eccentric manner to the main anchorage 4, through the aforementioned elastic elements 6a, 6b; the inertial mass 2 in fact has an asymmetrical mass distribution along the first horizontal axis x, in the example with a first portion 2a, and a second portion 2b, arranged on opposite sides with respect to the rotation axis A, the first portion 2a having an extension along the first horizontal axis x being greater with respect to the second portion 2b.

The detection structure 1 further comprises a first and a second resonant elements 10a, 10b, arranged in the window 5, in particular in a first and, respectively, in a second half 5a, 5b in which the same window 5 is divided by the rotation axis A, these first and second halves 5a, 5b being symmetrical with respect to a center O of the main anchorage 4.

In other words, the first resonant element 10a is arranged internally within the inertial mass 2, inside the first half 5a of the window 5, provided through the first portion 2a of the inertial mass 2; while the second resonant element 10b is arranged inside the second half 5b of the window 5, provided through the second portion 2b of the same inertial mass 2.

The first and second resonant elements 10a, 10b have linear extension symmetrically with respect to the aforementioned center O, in the example along the first horizontal axis x (with a much smaller dimension along the second horizontal axis y, thus being "thin" in the horizontal plane xy) and are formed by a respective beam anchored to both ends (the resonant elements are of the so-called "clamped-clamped" type).

In detail, a respective first end of the first and the second resonant elements 10a, 10b is coupled to the first, respectively, to the second elastic elements 6a, 6b, in proximity to the main anchorage 4; in particular, the coupling point between this respective first end and the respective first or second elastic element $6a$, $6b$ is located at a first distance $d_1$ (considered along the second horizontal axis y and along the longitudinal extension of the same elastic element) from the main anchorage 4 and at a second distance $d_2$ from the inertial mass 2, the first distance $d_1$ being smaller, in the illustrated example much smaller, than the second distance $d_2$.

Figure 4:
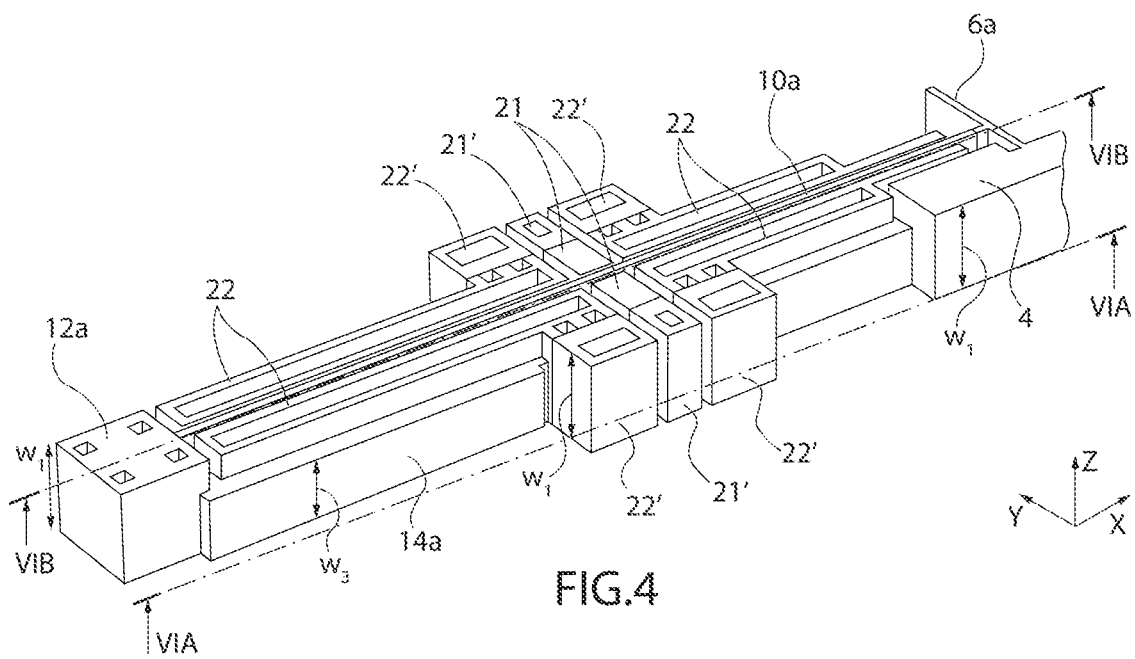
FIG. 4 is a perspective plan view of an enlarged portion of the detection structure of FIG. 3.
Figure 5A:
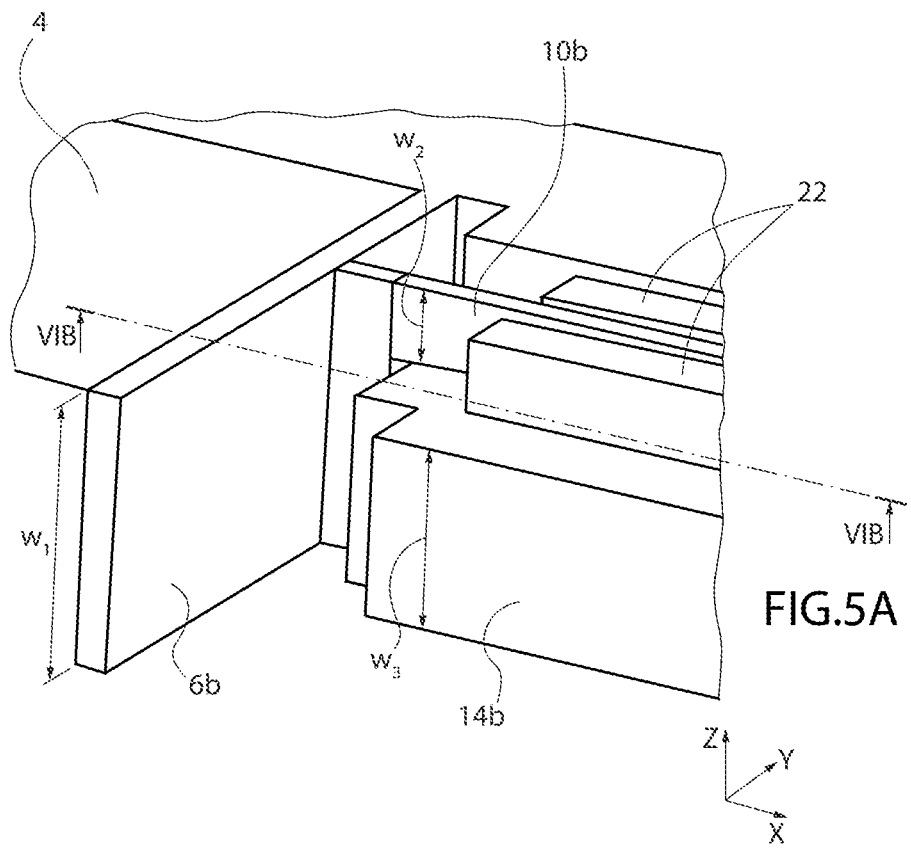
FIGS. 5A and 5B are a perspective plan view and, respectively, a sectional view of a further portion of the detection structure of FIG. 3.
Figure 5B:
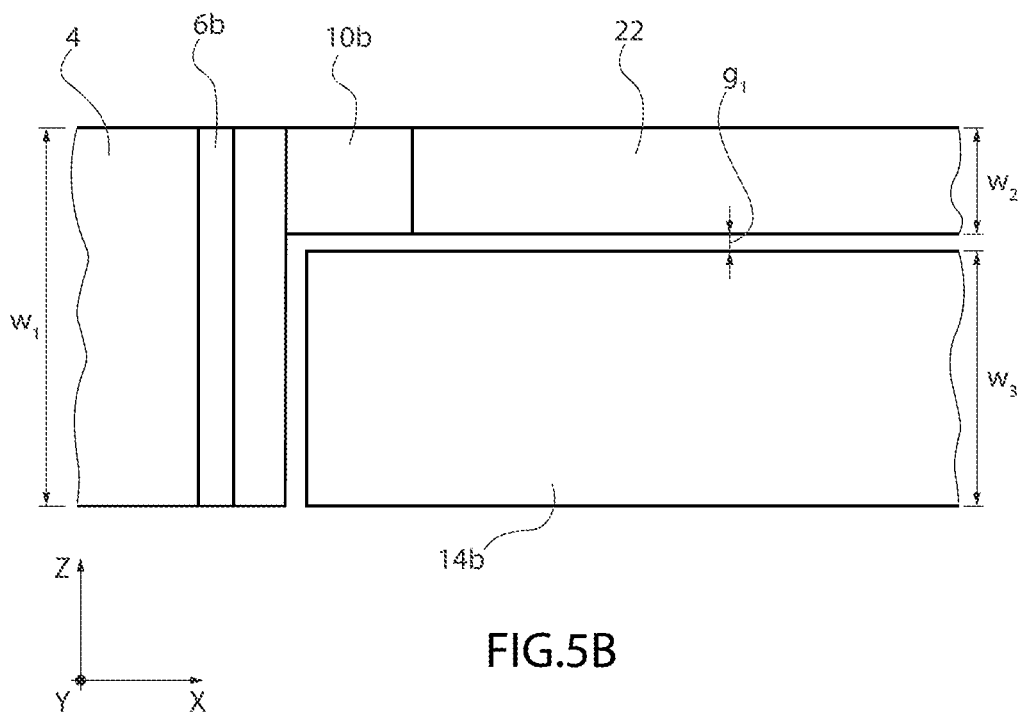

A respective second end of the first and the second resonant elements $10a$, $10b$ is also coupled to a first, respectively second, constraint element $12a$, $12b$, suspended above the substrate 8. For example, the first and second constraint elements $12a$, $12b$ have a substantially rectangular or square shape in the horizontal plane xy and a thickness corresponding to the aforementioned first thickness $w_1$ (as shown in FIG. 4 and in FIGS. 6A and 6B).

The aforementioned first and second constraint elements $12a$, $12b$ are fixedly coupled to the substrate 8, in an indirect manner, through a first, respectively second, auxiliary anchoring elements $14a$, $14b$ which extend below the first, respectively second, resonant elements $10a$, $10b$ (see for example the aforementioned FIGS. 4, 5A-5B and 6A-6B).

These auxiliary anchoring elements $14a$, $14b$ have a longitudinal extension along the first horizontal axis x and are coupled in an integrated manner to the respective first, second constraint element $12a$, $12b$ and moreover to the main anchorage 4 (being thus interposed in contact between the corresponding constraint element and the same main anchorage 4).

In detail, the first and second resonant elements $10a$, $10b$ have a second thickness $w_2$ along the z-axis (see the aforementioned FIGS. 5A-5B and 6A-6B), which is smaller than the first thickness $w_1$, in particular smaller than or equal to half of the same first thickness $w_1$ and are integrally coupled to the respective first, second elastic element $6a$, $6b$ and to the respective first, second constraint element $12a$, $12b$ at a respective top portion thereof (i.e., arranged at a greater distance along the z-axis with respect to the underlying substrate 8).

The aforementioned first and second auxiliary anchoring elements $14a$, $14b$ are thus arranged below the first, respectively second, resonant elements $10a$, $10b$, interposed between the same resonant elements and the substrate 8. These auxiliary anchoring elements $14a$, $14b$ also have a third thickness $w_3$, wherein the aforementioned first thickness $w_1$ corresponds to the sum of the second thickness $w_2$, of this third thickness $w_3$ and also of a first gap $g_1$, present (see FIGS. 5B and 6A-6B) between the aforementioned first and second auxiliary anchoring elements $14a$, $14b$ and the first and second resonant elements $10a$, $10b$.

As shown in FIGS. 6A-6B, a second gap $g_2$, in the example greater than the first gap $g_1$, is moreover present between the same first and second auxiliary anchoring elements $14a$, $14b$ and the underlying substrate 8.

In other words, the first and second auxiliary anchoring elements $14a$, $14b$ are arranged in a "floating" manner with respect to the substrate 8 and to the respective first or second resonant element $10a$, $10b$.

The same first and second auxiliary anchoring elements $14a$, $14b$ are thus integrally coupled to the respective first or second constraint element $12a$, $12b$ and to the main anchorage 4 at corresponding bottom portions (i.e., arranged at a shorter distance, or in proximity, along the z-axis with respect to the underlying substrate 8).

The detection structure 1 further comprises, for each resonant element $10a$, $10b$, a respective pair of driving electrodes 21, arranged on opposite sides of the respective resonant element $10a$, $10b$ (along the second horizontal axis y) in a so-called "parallel plate" configuration, in the example centrally with respect to the longitudinal extension of the same resonant element (and of the corresponding half $5a$, $5b$ of the window 5).

These driving electrodes 21 are used to drive (through a driving scheme known as "push-pull") the associated resonant element $10a$, $10b$ in a condition of resonance oscillation, by applying a suitable electrical potential difference; for example, the resonant element $10a$, $10b$ may be set to a constant, reference bias voltage, while the associated driving electrodes 21 may be set to a time-varying driving voltage, for example with a sinusoidal trend, in so as to cause a resonant oscillating movement of the same resonant element $10a$, $10b$.

This resonant driving of the resonant elements $10a$, $10b$ is induced in a continuous manner, regardless of the rotation of the inertial mass 2 due to the presence of the external acceleration to be detected.

Figure 7:
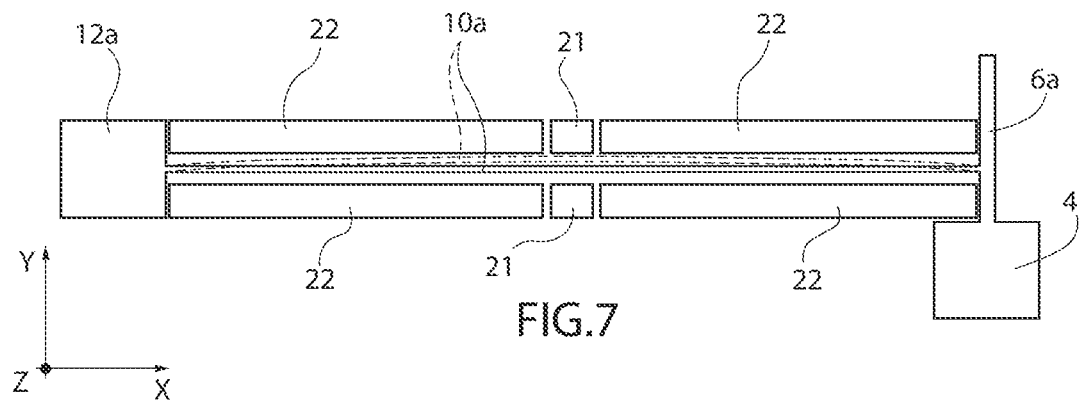
FIG. 7 schematically shows the deformation of a resonant element of the detection structure.

In this regard, FIG. 7 shows the resonant oscillation movement of a resonant element, in the example the first resonant element $10a$, which corresponds to the corresponding first bending mode in the horizontal plane xy.

The detection structure 1 further comprises, for each resonant element $10a$, $10b$, two respective pairs of detection electrodes 22, arranged on opposite sides of the driving electrodes 21 along the first horizontal axis x and also facing the respective resonant element $10a$, $10b$ on opposite sides thereof (along the second horizontal axis y) in a "parallel plate" configuration.

As shown for example in FIG. 4, these detection electrodes 22 have a longitudinal extension along the first horizontal axis x, parallel to the respective resonant element $10a$, $10b$.

The detection electrodes 22 are configured to detect, through a variation of the capacitive coupling with the respective resonant element $10a$, $10b$, variations of the corresponding resonance frequency (advantageously, according to a differential detection scheme). The driving electrodes 21 and the detection electrodes 22 have (see FIGS. 4, 5A-5B and 6A) the second thickness $w_2$ along the z-axis and are arranged above the corresponding first or second auxiliary anchoring element $14a$, $14b$; furthermore, each of the aforementioned driving electrodes 21 and detection electrodes 22 has an anchoring portion 21', 22', which extends up to the substrate 8, mechanically coupled to the same substrate 8, arranged externally or laterally (in the horizontal plane xy) with respect to the corresponding auxiliary anchoring element $14a$, $14b$.

In particular, the aforementioned anchoring portions 21', 22', are arranged centrally with respect to the longitudinal extension of the corresponding resonant elements $10a$, $10b$ (and of the corresponding half $5a$, $5b$ of the window 5), in mutual proximity and have small dimensions, so as to minimize the effects, on the same electrodes, of any displacements of the substrate 8 due to residual mechanical and/or thermal stresses.

As shown for example in the aforementioned FIGS. 3 and 4, the detection electrodes 22 also have holes internally, to reduce the capacitive coupling with the underlying corresponding auxiliary anchoring element $14a$, $14b$.

Figure 8:
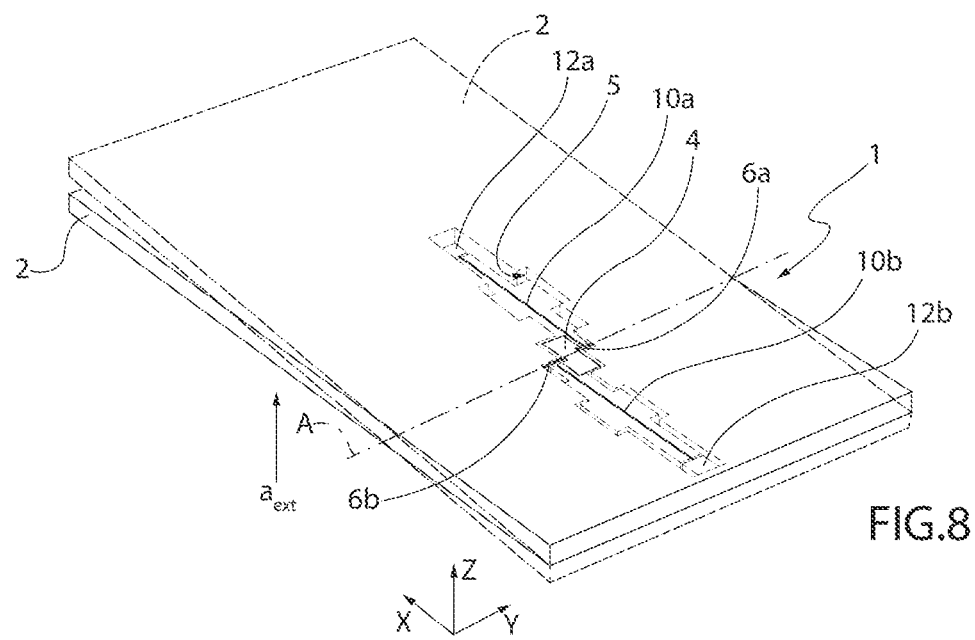
FIG. 8 schematically shows the rotation of an inertial mass of the detection structure due to an external acceleration.

During operation, and as shown schematically in FIG. 8, in response to an external acceleration $a_{ext}$ acting along the z-axis, the inertial mass 2 rotates around the rotation axis A according to the first torsional mode thereof; this rotation is converted into an axial load on the resonant elements $10a$, $10b$, thanks in particular to the reduced thickness of the resonant elements with respect to the elastic elements $6a$, $6b$ and to the inertial mass 2 (and also to the coupling of the same resonant elements at the sole top portion of the same elastic elements 6a, 6b).

A traction or elongation stress is thus generated on one of these resonant elements (in the example illustrated, in the first resonant element 10a) and a corresponding compression stress in the other resonant element (in the example illustrated, in the second resonant element 10b).

Due to the consequent variation of mechanical stiffness, a differential variation of the resonance frequency of the aforementioned resonant elements 10a, 10b thus occurs (in the example, the resonance frequency of the first resonant element 10a increases, while the resonance frequency of the second resonant element 10b undergoes a corresponding decrease).

The external acceleration $a_{ext}$ may thus be measured by detecting the aforementioned frequency variations of the resonant elements 10a, 10b.

Figure 9:
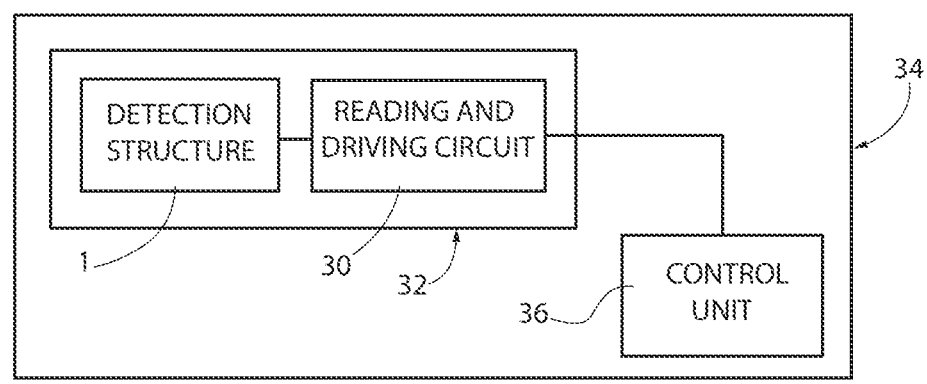
FIG. 9 is a simplified block diagram of a resonant accelerometer incorporating the detection structure, and of an electronic apparatus provided with this resonant accelerometer.

As shown schematically in FIG. 9, the detection structure 1 is conveniently coupled to a suitable electronic readout and actuation circuit 30, configured to carry out suitable processing and combinations of the resonance frequency values of the aforementioned first and second resonant elements 10a, 10b (in particular to perform a difference of these values), to determine the value of the external acceleration $a_{ext}$.

The detection structure 1 and the associated electronic readout and actuation circuit 30 together form a z-axis resonant accelerometer 32; the electronic circuit 30 is conveniently provided in an integrated manner as an ASIC (Application Specific Integrated Circuit), in a die, which may advantageously be accommodated in a same package that also houses the die wherein the detection structure 1 is provided.

As shown schematically in the same FIG. 9, an electronic apparatus 34, provided with this resonant accelerometer 32, for example a portable apparatus, such as a smartphone, a tablet, a palmtop, a laptop, an electronic watch or bracelet, a photographic camera or video camera, further comprises a control unit 36 (e.g., a microprocessor), electrically connected to the electronic readout and actuation circuit 30, to receive measurements of the external acceleration $a_{ext}$ to perform control operations for managing the same electronic apparatus 34.

It is underlined that the presence of the two resonant elements 10a, 10b subject to opposite variations of the resonance frequency affords various advantages, including:

the sensitivity in the detection of the external acceleration $a_{ext}$ is doubled by measuring the difference between the frequency of the two resonant elements, instead of the variation of frequency of a single resonant element;

the linearity of the system is improved, i.e., the response of the accelerometer may be linearized in a wider range of accelerations.

However, it is noted that a different embodiment of the detection structure 1 might also include a single one of these resonant elements, for example the first resonant element 10a.

The aforementioned detection structure 1 may be advantageously manufactured with known processes of surface micromachining of semiconductor materials, for example using the so-called ThELMA (Thick Epipoly Layer for Microactuators and Accelerometers) process.

In general, the ThELMA process enables formation of suspended structures with relatively small thicknesses (for example, of the order of 20-30 µm), anchored to a substrate through yielding parts (springs) and therefore capable of displacing, e.g., due to inertial effect, with respect to the underlying silicon substrate. The process consists of various manufacturing steps, including:

thermal oxidation of the substrate;
deposition and patterning of horizontal electrical interconnections;
deposition and patterning of a sacrificial layer, in particular of silicon oxide;
epitaxial growth of a first structural layer (e.g., made of polysilicon, designed to form the suspended masses);
patterning of the structural layer through trench etching;
removal of the sacrificial oxide for releasing the various suspended masses; and
deposition of contact metallizations.

In particular, for manufacturing of the detection structure 1 a double ThELMA process may be conveniently carried out, with the epitaxial growth of a further structural layer above the first structural layer formed epitaxially on the substrate.

In the specific case, the aforementioned second thickness $w_2$ may substantially correspond to the thickness of this further structural layer, the aforementioned third thickness $w_3$ may substantially correspond to the thickness of the first structural layer, while the aforementioned first thickness $w_1$ may substantially correspond to the sum of the thicknesses of the further structural layer and of the first structural layer (and additionally of the aforementioned first gap $g_1$).

Suitable trenches may be opened for definition of the elements forming the detection structure 1, crossing the sole further structural layer or both structural layers, until reaching the substrate.

As illustrated for example in FIG. 3, holes are provided throughout the thickness of the inertial mass 2 (and of the other manufactured elements), in order to allow the release with respect to the substrate 8 by etching underlying material regions (in particular of the aforementioned sacrificial oxide).

The advantages of the present solution are clear from the previous description.

In any case, it is underlined that the detection structure 1 previously described allows obtaining: a high sensitivity to external acceleration $a_{ext}$ and a reduced sensitivity to disturbances; a reduced footprint in the horizontal plane xy; a high linear range (e.g., up to 50 g) and a high dynamics (substantially limited by the distance between the inertial mass 2 and the substrate 8).

Furthermore, the detection structure 1 may be provided with manufacturing methods of known type, without requiring substantial modifications to commonly used processes.

For example, the present Applicant has shown through simulations that a sensitivity of 280 Hz/g, dynamics up to 17 g and non-linearity less than 2% (at 50 g) may be obtained with dimensions of 1120 µm (along the first horizontal axis x), 608 µm (along the second horizontal axis y) and 30 µm (along the z-axis).

Finally, it is clear that modifications and variations may be made to what has been described and illustrated without thereby departing from the scope of the present disclosure.

For example, it is underlined that different shapes and dimensions might be provided for the inertial mass 2, as long as it retains the characteristics of imbalance and eccentricity with respect to the rotation axis A; for example, the inertial mass 2 might have a "T"-shape (i.e., with the second portion 2b having a smaller dimension than the first portion 2a along the second horizontal axis y).

A different number of resonant elements might also be present in the detection structure 1, for example a single one (e.g., the first resonant element 10*a*), or even more elements to further improve its sensitivity. For example, two resonant elements might be coupled to each elastic element 6*a*, 6*b*, on opposite sides with respect to the rotation axis A.

Furthermore, the anchoring portions 21', 22' of the driving electrodes 21 and of the detection electrodes 22 might be arranged closer to the main anchorage 4 of the detection structure 1, to further reduce the effects of disturbances, for example of mechanical or thermal stresses.

A detection structure (1) for a vertical-axis resonant accelerometer (32), may be summarized as including an inertial mass (2), suspended above a substrate (8) and having a plane (xy) of main extension defined by a first (x) and a second (y) horizontal axes, a window (5) being provided within the inertial mass (2) traversing it throughout a thickness thereof, said inertial mass (2) being coupled to a main anchorage (4), arranged in said window (5) and integral with said substrate (8), through a first and a second anchoring elastic elements (6*a*, 6*b*) of a torsional type and with longitudinal extension on opposite sides of said main anchorage (4), said first and second elastic elements (6*a*, 6*b*) defining a rotation axis (A) of said inertial mass (2) parallel to said second horizontal axis (y) and being configured to allow said inertial mass (2) an inertial movement of rotation around said rotation axis (A) in response to an external acceleration ($a_{ext}$) acting along a vertical axis (z) transverse to said plane (xy); and at least a first resonant element (10*a*), having a longitudinal extension along said first horizontal axis (x), coupled between said first elastic element (6*a*) and a first constraint element (12*a*) arranged in said window (5). Said first constraint element (12*a*) may be suspended above said substrate (8) and fixedly coupled to said substrate (8) through a first auxiliary anchoring element (14*a*), which extends below said first resonant element (10*a*) with longitudinal extension along said first horizontal axis (x) and is integrally coupled between said first constraint element (12*a*) and said main anchorage (4).

Said first resonant element (10*a*) may be coupled to said first elastic element (6*a*) so that the inertial movement of rotation of said inertial mass (2) around the rotation axis (A) causes an axial stress, of compression or traction, on said first resonant element (10*a*) and a consequent variation of a corresponding resonance frequency.

Said first elastic element (6*a*) may have a first thickness ($w_1$) and said first resonant element (10*a*) may have a second thickness ($w_2$) along said vertical axis (z), said second thickness ($w_2$) being smaller with respect to the first thickness ($w_1$); and said first resonant element (10*a*) may be integrally coupled to said first elastic element (6*a*) and to said first constraint element (12*a*) at a respective top portion thereof, arranged at a distance along said vertical axis (z) with respect to the underlying substrate (8).

Said first auxiliary anchoring element (14*a*) may be coupled to said first constraint element (12*a*) and to the main anchorage (4) at a respective bottom portion thereof; and said first auxiliary anchoring element (14*a*) may be interposed in a floating manner between said first resonant element (10*a*) and said substrate (8), with a first gap ($g_1$) present between said first auxiliary anchoring element (14*a*) and said first resonant element (10*a*) and a second gap ($g_2$) present between said first auxiliary anchoring element (14*a*) and said substrate (8).

Said first auxiliary anchoring element (14*a*) may have a third thickness ($w_3$) along said vertical axis (z). Said first thickness ($w_1$) may be equal to the sum of said second ($w_2$) and third ($w_3$) thicknesses and of a first gap ($g_1$) present between said first auxiliary anchoring element (14*a*) and said first resonant element (10*a*).

Said first resonant element (10*a*) may be coupled to said first elastic element (6*a*) in proximity to said main anchorage (4).

The structure may further include a pair of driving electrodes (21), arranged on opposite sides of the first resonant element (10*a*) along said second horizontal axis (y) and configured to drive said first resonant element (10*a*) in a resonance oscillation movement; and two pairs of detection electrodes (22), arranged on opposite sides of the driving electrodes (21) along said first horizontal axis (x) and facing opposite sides of said first resonant element (10*a*) along said second horizontal axis (y), configured so as to detect, through a variation of the capacitive coupling with said first resonant element (10*a*), a variation of the corresponding resonance frequency.

Said driving electrodes (21) and said detection electrodes (22) may be arranged above said first auxiliary anchoring element (14*a*) and also have respective anchoring portions (21', 22'), extending up to, and integral with, said substrate (8), arranged laterally in the horizontal plane (xy) with respect to said first auxiliary anchoring element (14*a*). Said respective anchoring portions (21', 22') may be arranged centrally with respect to the longitudinal extension of the first resonant element (10*a*) and in mutual proximity.

The structure may further include a second resonant element (10*b*), having longitudinal extension along said first horizontal axis (x) and coupled between said second elastic element (6*b*) and a second constraint element (12*b*) arranged in said window (5). Said second constraint element (12*b*) may be suspended above said substrate (8) and may be fixedly coupled to said substrate (8) through a second auxiliary anchoring element (14*b*) which extends below said second resonant element (10*b*) with longitudinal extension along said first horizontal axis (x) and may be integrally coupled between said second constraint element (12*b*) and said main anchorage (4).

Said first resonant element (10*a*) may be arranged in a first half in which said window (5) may be divided by said rotation axis (A); and said second resonant element (10*b*) may be arranged in a second half of said window (5), on opposite side of said first resonant element (10*a*) with respect to said rotation axis (A).

Said first and second resonant elements (10*a*, 10*b*) and said first and second auxiliary anchoring elements (14*a*, 14*b*) may be arranged in a symmetrical manner with respect to a center (O) of said main anchorage (4).

Said inertial mass (2) may have an asymmetrical mass distribution with respect to said rotation axis (A), in such a way that it may be constrained in an eccentric manner to the main anchorage (4).

A resonant accelerometer (32), may be summarized as including a detection structure (1) as described above, and configured to detect a linear external acceleration component ($a_{ext}$), directed along said vertical axis (z).

The accelerometer may further include a readout and actuation circuit (30) electrically coupled to said detection structure (1).

An electronic apparatus (34), may be summarized as including a resonant accelerometer (32) as described above, and a control unit (36), electrically connected to said readout and actuation circuit (30).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A detection structure for a vertical axis resonant accelerometer, the detection structure comprising:
a substrate;
an inertial mass suspended above the substrate and having a plane of main extension defined by first and second horizontal axes, the vertical axis being transverse to the plane;
a window in the inertial mass, the window extending throughout a thickness of the inertial mass;
a main anchorage coupled to the inertial mass and arranged in the window;
first and second anchoring elastic elements coupled to the main anchorage and the substrate, the first and second anchoring elastic elements being of a torsional type with longitudinal extensions on opposite sides of the main anchorage, the first and second anchoring elastic elements being configured to rotate the inertial mass about a rotation axis parallel to the second horizontal axis;
a first resonant element having a longitudinal extension along the first horizontal axis;
a first auxiliary anchoring element having a longitudinal extension along the first horizontal axis, and extending below the first resonant element; and
a first constraint element in the window, suspended above the substrate, and fixedly coupled to the substrate through the first auxiliary anchoring element, the first auxiliary anchoring element being coupled between the first constraint element and the main anchorage, the first resonant element being coupled between the first anchoring elastic element and the first constraint element.

2. The detection structure according to claim 1, wherein the first and second anchoring elastic elements are configured to allow the inertial mass an inertial movement of rotation around the rotation axis in response to an external acceleration acting along the vertical axis.

3. The detection structure according to claim 2, wherein the first resonant element is coupled to the first anchoring elastic element such that the inertial movement of rotation of the inertial mass around the rotation axis causes an axial stress, of compression or traction, on the first resonant element, and causes a consequent variation of a corresponding resonance frequency.

4. The detection structure according to claim 1, wherein
the first anchoring elastic element has a first thickness along the vertical axis,
the first resonant element has a second thickness along the vertical axis,
the second thickness is smaller than the first thickness, and
the first resonant element is coupled to the first anchoring elastic element and to the first constraint element at a respective top portion of the first resonant element, and is arranged at a distance along the vertical axis with respect to the substrate.

5. The detection structure according to claim 4, wherein
the first auxiliary anchoring element is coupled to the first constraint element and to the main anchorage at a respective bottom portion of the first auxiliary anchoring element, and
the first auxiliary anchoring element is interposed in a floating manner between the first resonant element and the substrate, with a first gap between the first auxiliary anchoring element and the first resonant element and a second gap between the first auxiliary anchoring element and the substrate.

6. The detection structure according to claim 4, wherein
the first auxiliary anchoring element has a third thickness along the vertical axis, and
the first thickness is equal to a sum of the second and third thicknesses and of a thickness of a first gap between the first auxiliary anchoring element and the first resonant element.

7. The detection structure according to claim 1, wherein the first resonant element is coupled to the first anchoring elastic element in proximity to the main anchorage.

8. The detection structure according to claim 1, further comprising:
a pair of driving electrodes arranged on opposite sides of the first resonant element along the second horizontal axis, and configured to drive the first resonant element in a resonance oscillation movement; and
two pairs of detection electrodes arranged on opposite sides of the pair of driving electrodes along the first horizontal axis, facing opposite sides of the first resonant element along the second horizontal axis, and configured to detect, through a variation of a capacitive coupling with the first resonant element, a variation of a corresponding resonance frequency.

9. The detection structure according to claim 8, wherein
the driving electrodes and the detection electrodes are arranged above the first auxiliary anchoring element, have respective anchoring portions extending up to and integral with the substrate, and are arranged laterally in the plane with respect to the first auxiliary anchoring element, and
the respective anchoring portions are arranged centrally with respect to the longitudinal extension of the first resonant element and in mutual proximity.

10. The detection structure according to claim 1, further comprising:
a second resonant element, having a longitudinal extension along the first horizontal axis;
a second auxiliary anchoring element having a longitudinal extension along the first horizontal axis, and extending below the second resonant element; and
a second constraint element in the window, suspended above the substrate, and fixedly coupled to the substrate through the second auxiliary anchoring element, the second auxiliary anchoring element being coupled between the second constraint element and the main anchorage, the second resonant element being coupled between the second anchoring elastic element and the second constraint element.

11. The detection structure according to claim 10, wherein
the first resonant element is arranged in a first half in which the window is divided by the rotation axis, and
the second resonant element is arranged in a second half of the window on an opposite side of the first resonant element with respect to the rotation axis.

12. The detection structure according to claim 10, wherein the first and second resonant elements and the first and second auxiliary anchoring elements are arranged in a symmetrical manner with respect to a center of the main anchorage.

13. The detection structure according to claim 1, wherein the inertial mass has an asymmetrical mass distribution with respect to the rotation axis in such a way that the inertial mass is constrained in an eccentric manner to the main anchorage.

14. A resonant accelerometer, comprising:
a substrate; and
a detection structure configured to detect a linear external acceleration component along a vertical axis, the detection structure including:
an inertial mass suspended above the substrate and having a plane of main extension defined by first and second horizontal axes, the vertical axis being transverse to the plane;
a window in the inertial mass, the window extending throughout a thickness of the inertial mass;
a main anchorage coupled to the inertial mass and arranged in the window;
first and second anchoring elastic elements coupled to the main anchorage and the substrate, the first and second anchoring elastic elements being of a torsional type with longitudinal extensions on opposite sides of the main anchorage, the first and second anchoring elastic elements being configured to rotate the inertial mass about a rotation axis parallel to the second horizontal axis;
a first resonant element having a longitudinal extension along the first horizontal axis;
a first auxiliary anchoring element having a longitudinal extension along the first horizontal axis, and extending below the first resonant element; and
a first constraint element in the window, suspended above the substrate, and fixedly coupled to the substrate through the first auxiliary anchoring element, the first auxiliary anchoring element being coupled between the first constraint element and the main anchorage, the first resonant element being coupled between the first anchoring elastic element and the first constraint element.

15. The resonant accelerometer according to claim 14, further comprising:
a readout and actuation circuit electrically coupled to the detection structure, and configured to determine the linear external acceleration component based on resonance frequency values of the first resonant element.

16. The resonant accelerometer according to claim 14, wherein the detection structure includes:
a second resonant element, having a longitudinal extension along the first horizontal axis;
a second auxiliary anchoring element having a longitudinal extension along the first horizontal axis, and extending below the second resonant element; and
a second constraint element in the window, suspended above the substrate, and fixedly coupled to the substrate through the second auxiliary anchoring element, the second auxiliary anchoring element being coupled between the second constraint element and the main anchorage, the second resonant element being coupled between the second anchoring elastic element and the second constraint element.

17. The resonant accelerometer according to claim 14, wherein the first and second anchoring elastic elements are configured to allow the inertial mass an inertial movement of rotation around the rotation axis in response to an external acceleration acting along the vertical axis.

18. An electronic apparatus, comprising:
a substrate; and
a detection structure configured to detect a linear external acceleration component along a vertical axis, the detection structure including:
an inertial mass suspended above the substrate and having a plane of main extension defined by first and second horizontal axes, the vertical axis being transverse to the plane;
a window in the inertial mass, the window extending throughout a thickness of the inertial mass;
a main anchorage coupled to the inertial mass and arranged in the window;
first and second anchoring elastic elements coupled to the main anchorage and the substrate, the first and second anchoring elastic elements being of a torsional type with longitudinal extensions on opposite sides of the main anchorage, the first and second anchoring elastic elements being configured to rotate the inertial mass about a rotation axis parallel to the second horizontal axis;
a first resonant element having a longitudinal extension along the first horizontal axis;
a first auxiliary anchoring element having a longitudinal extension along the first horizontal axis, and extending below the first resonant element; and
a first constraint element in the window, suspended above the substrate, and fixedly coupled to the substrate through the first auxiliary anchoring element, the first auxiliary anchoring element being coupled between the first constraint element and the main anchorage, the first resonant element being coupled between the first anchoring elastic element and the first constraint element;
a readout and actuation circuit electrically coupled to the detection structure, and configured to determine the linear external acceleration component based on resonance frequency values of the first resonant element; and
a control unit electrically connected to the readout and actuation circuit, and configured to control the electronic apparatus based on the linear external acceleration component.

19. The electronic apparatus according to claim 18, wherein the detection structure includes:
a second resonant element, having a longitudinal extension along the first horizontal axis;
a second auxiliary anchoring element having a longitudinal extension along the first horizontal axis, and extending below the second resonant element; and
a second constraint element in the window, suspended above the substrate, and fixedly coupled to the substrate through the second auxiliary anchoring element, the second auxiliary anchoring element being coupled between the second constraint element and the main anchorage, the second resonant element being coupled between the second anchoring elastic element and the second constraint element.

20. The electronic apparatus according to claim 18, wherein the first and second anchoring elastic elements are configured to allow the inertial mass an inertial movement of rotation around the rotation axis in response to an external acceleration acting along the vertical axis.

* * * * *